Patented Mar. 21, 1950

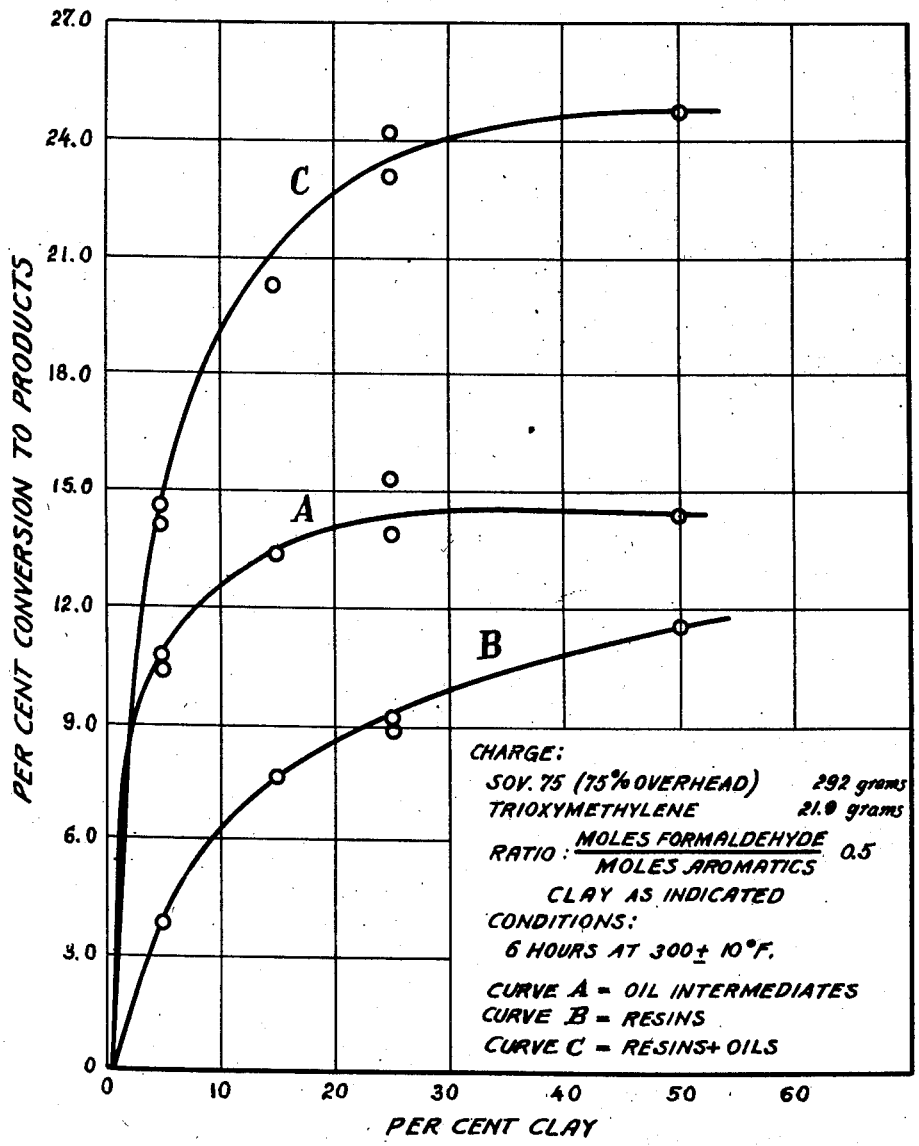

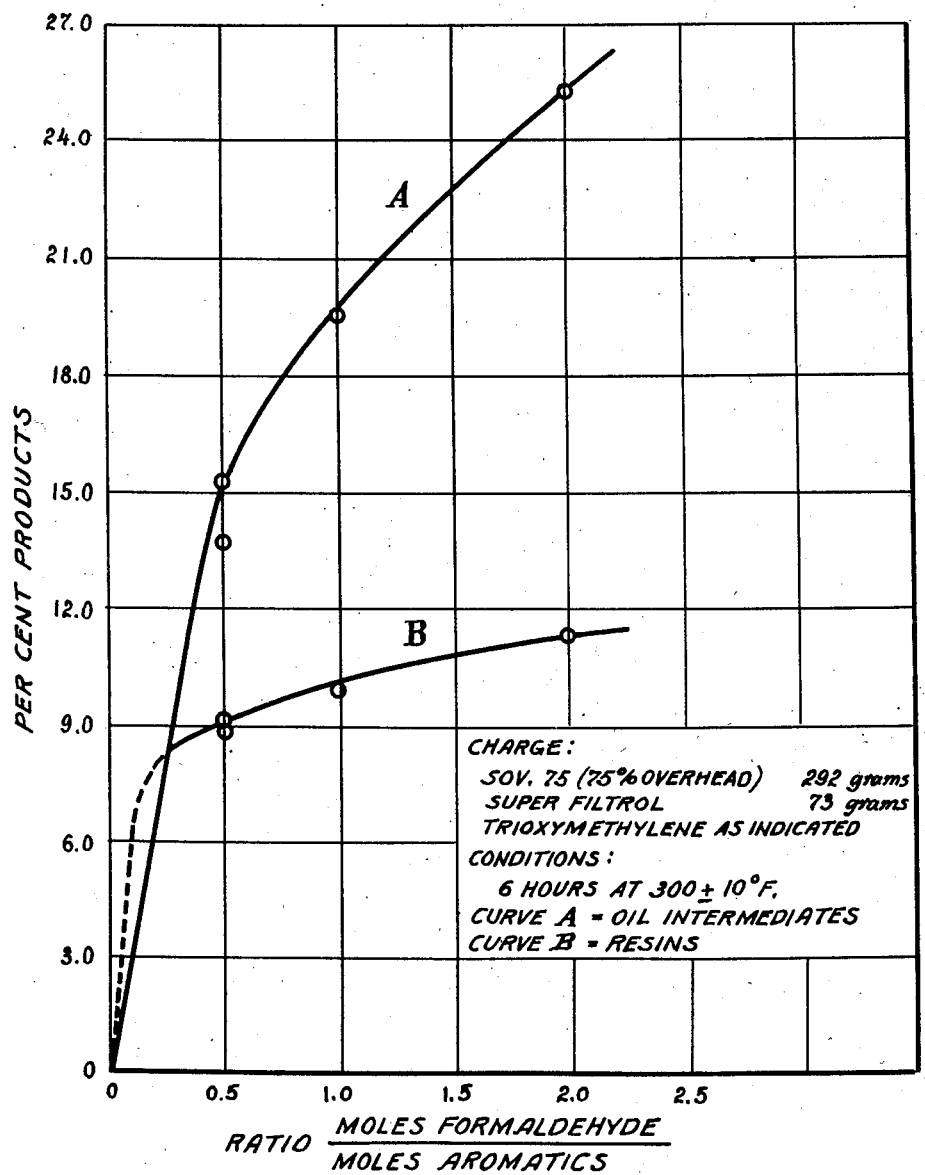

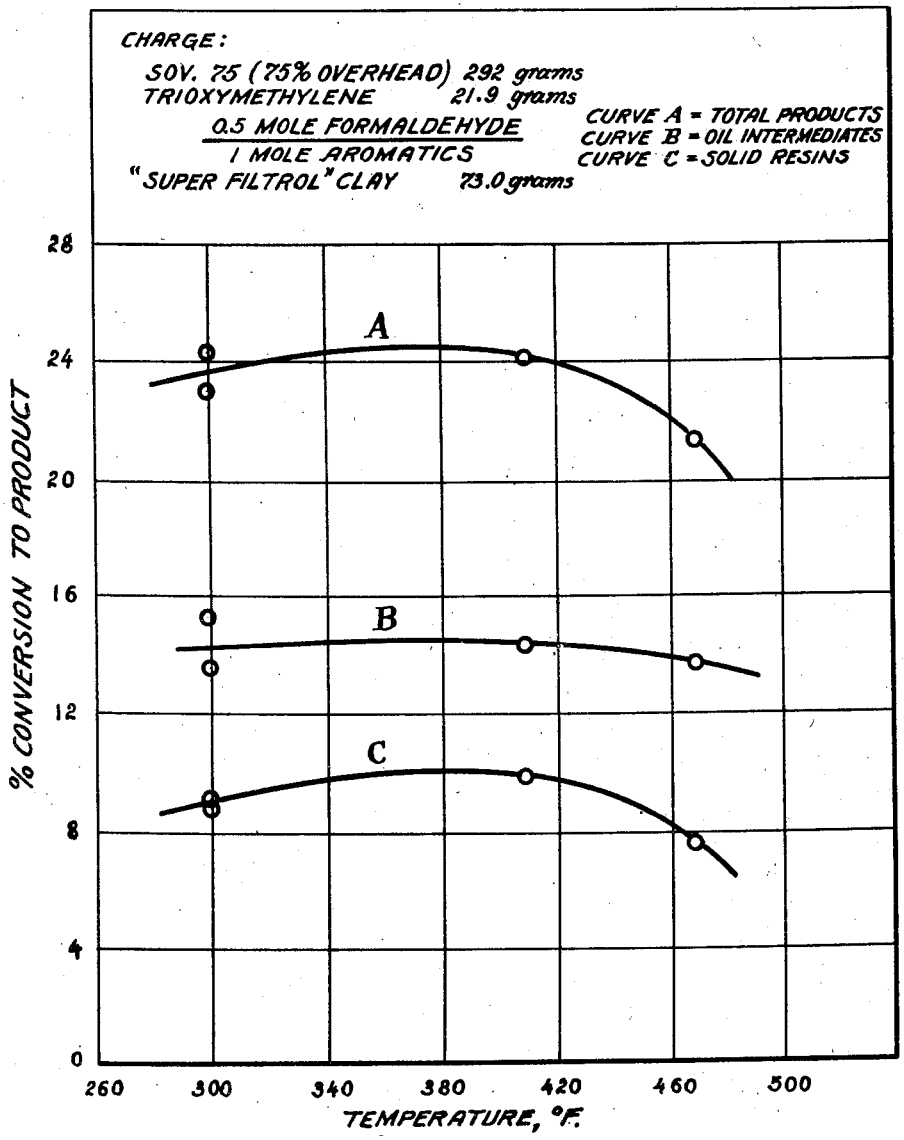

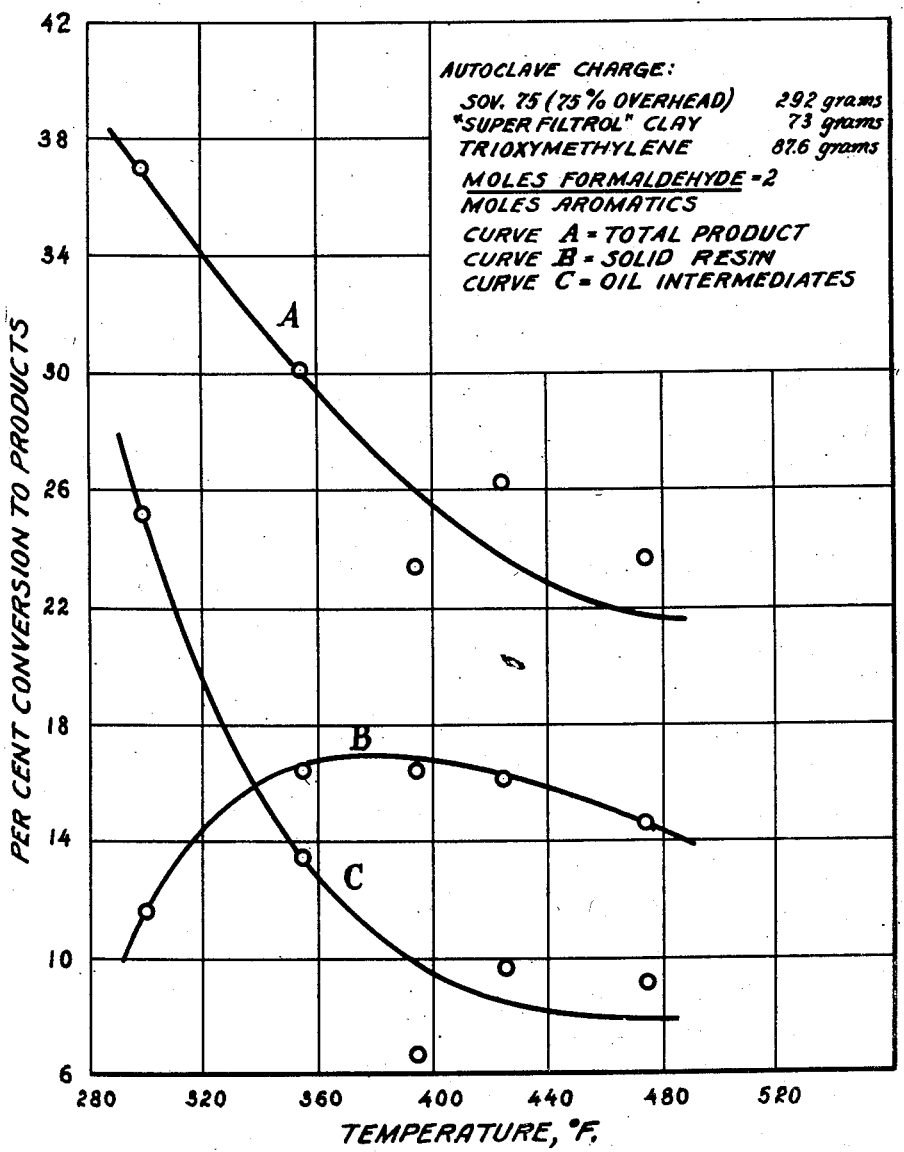

2,501,600

UNITED STATES PATENT OFFICE 2,501,600

RESINIFICATION OF AROMATIC HYDROCARBONS

Charles F. Feasley, Woodbury, N. J., assignor to Socony-Vacuum Oil Company, Incorporated, a corporation of New York Application November 9, 1945, Serial No. 627,763

17 Claims. (Cl. 260—67)

The present invention relates to the resinification of aromatic hydrocarbons and, more particularly, to a novel condensation catalyst and to the products produced by the condensation of aromatic hydrocarbons in the presence of said novel catalyst.

The condensation of aromatic hydrocarbons with various carbonyl compounds, especially aldehydes, in the presence of various catalysts is well known. In the prior art there are many descriptions of methods for carrying out the condensation of aromatic hydrocarbons with carbonyl compounds employing sulfuric acid, metal chlorides, such as ferric chloride, aluminum chloride, and zinc chloride, and acetic acid solutions of such metal chlorides. More recently it has been shown that the hydrogen halides, and particularly hydrogen fluoride, may be used to accelerate this condensation. In other words, the catalysts of the prior art are either acids or acid salts. It has now been discovered that this reaction can be accelerated by novel catalysts which do not appear to be of the same class as the catalysts described in the prior art. In addition, the novel products produced by condensing aromatic hydrocarbons and carbonyl compounds in the presence of the novel catalyst are very light colored compared to the products of the prior art processes. Moreover, the novel catalyst can be recovered and regenerated.

It is an object of the present invention to provide a means for producing resinous condensation products by reacting aromatic hydrocarbons and carbonyl compounds in the presence of a recoverable, regeneratable catalyst. It is another object of the present invention to provide novel catalysts for the condensation of aromatic hydrocarbons with carbonyl compounds. It is a further object of the present invention to provide novel resinous condensation products and viscous oils by reacting aromatic hydrocarbons and carbonyl compounds in the presence of a recoverable, regeneratable condensation agent. Other objects and advantages will become apparent from the following description taken in conjunction with the drawings, in which Figure 1 is a graph showing the relationship between per cent conversion to various products and the amount of catalyst employed. Figure 2 is a graph showing the relation between the ratio of formaldehyde to aromatics and the conversion to various products. Figure 3 is a graph showing the relation between per cent conversion and temperature at a mole ratio of formaldehyde to aromatic hydrocarbons of 0.5 and Figure 4 is a graph showing the relation between temperature and conversion at a mole ratio of formaldehyde to aromatic hydrocarbons of 2.

In general, the novel process involves heating an aromatic hydrocarbon or a mixture of hydrocarbons containing a substantial amount of aromatic hydrocarbons with a carbonyl compound in the presence of the novel catalyst under autogenous pressure at elevated temperatures of about 220° F. to about 420° F. until the reaction has become substantially completed. Suitable catalysts include the non-swelling, crystalline rather than amorphous, bentonite clays of the montmorillonite type which have been activated by an acid treatment to give a composition approaching $Al_2Si_4O_{10}(OH)_2 \cdot nH_2O$. These clays may be natural or synthetic. In addition to the activated montmorillonite type clays, fresh burnt Attapulgus clay, silica gel, and alumina-silica gel catalysts containing about 7 per cent to about 15 per cent alumina have also given satisfactory results. In other words, the novel catalyst is a solid adsorbent inorganic contact material, preferably in finely-divided or powdered form.

The carbonyl compounds employed are those described in the prior art. It is preferred, however, to use formaldehyde, and particularly trioxymethylene $(CH_2O)x$ or trioxane $(CH_2O)_3$.

In addition to resinous products, intermediate liquids are also obtained which have many uses.

Illustrative but in no way limiting are the following examples of preferred embodiments of the present invention. In these tests a non-swelling bentonite clay of the montmorillonite type which had been activated by an acid treatment to give a composition approaching $$Al_2Si_4O_{10}(OH)_2 \cdot nH_2O$$

was used. This product is available in the activated state under the trade name "Super Filtrol." The acid activation treatment is well known to those skilled in the art and is described more or less in detail by B. A. Stagner in "The Science of Petroleum," volume III, page 1699 (Oxford Press) (1938). For the activation of small quantities of clay a similar treatment may be used. Thus, one kilogram of bentonite is boiled with 2,000 cubic centimeters of 17 per cent sulfuric acid for three hours. The mixture is filtered and the clay washed with distilled water until the filtrate is substantially free from acid (0.2 to 0.5 per cent acid). The clay is then dried to a moisture content of about 15 per cent and ground to pass a 200-mesh screen. When the acid treated clay is washed with "hard" water after the acid is neutralized, the clay is injured by absorbing basic ions from the water.

When only part of the total extractable material is leached from the clay by the acid, the maximum activity is developed. The optimum concentration of the acid is about 15 per cent to about 20 per cent. Sulfuric and hydrochloric acids are the most economical to use although sulfuric acid is somewhat slower than hydrochloric.

Illustrative of suitable materials for treatment in accordance with the principles of the present invention are the aromatic petroleum stocks and particularly those aromatic petroleum stocks known to the art as "Sovasols."

EXAMPLE I

"Sovasol" #75 (75 per cent overhead) which is chiefly trimethyl benzenes, has the following properties:

| | |
|---|---|
| Specific gravity $\frac{60° F.}{60° F.}$ | 0.8348 |
| A. P. I. gravity $\frac{60° F.}{60° F.}$ | 38.0 |
| Italian bromine index | 0.0 |
| Per cent aromatics | 60–61.8 |

A. S. T. M. distillation

| | °F. |
|---|---|
| I. B. P. | 300 |
| 5 | 314 |
| 10 | 319 |
| 20 | 322 |
| 30 | 325 |
| 40 | 328 |
| 50 | 330 |
| 60 | 332 |
| 70 | 335 |
| 80 | 338 |
| 90 | 344 |
| E. P. | 371 |
| Per cent recovery | 99 |
| Per cent residue | 1 |

"Sovasol" #75 (75 per cent overhead) (400 grams), Stoddard solvent (800 cubic centimeters), 45 grams of trioxymethylene and 100 grams of "Super Filtrol" clay were stirred and heated together at atmospheric pressure for 14 hours at 70° C. to 75° C. The reaction mixture was filtered and the clay washed with benzene. Upon topping the reaction mixture to 160° C. (vapor temperature) at 20 millimeters, 92.5 grams (22.6 per cent conversion) of a viscous light yellow oil was obtained. This oil had a molecular weight of 337 and a hydroxyl number of 3.

EXAMPLE II

"Sovasol" #75 (75 per cent overhead) (400 grams), 800 cubic centimeters of Stoddard solvent, 45 grams of trioxymethylene (paraformaldehyde) and 100 grams of "Super Filtrol" clay were stirred and heated together at atmospheric pressure for 16 hours at 80±5° C. The reaction mixture was filtered and the clay washed with benzene. The combined filtrates were topped to remove benzene, Stoddard solvent, and unreacted "Sovasol" #75 (75 per cent overhead). The material boiling from 175° C. at 760 millimeters to 285° C. at 3 millimeters (pot temperature) weighed 189 grams, had a molecular weight of 189 and a hydroxyl number of 1 and, no doubt, still contained some unreacted "Sovasol" #75 (75 per cent overhead). The final distillate boiling at 285° C. to 300° C. (pot temperature) at 3 millimeters congealed to a yellow tacky solid weighing 15 grams. The light-amber resin which remained as a still residue weighed 46 grams and had a ring and ball melting point of 191° F.

EXAMPLE III

An aromatic petroleum stock containing about 60.1 per cent aromatic hydrocarbons, chiefly $C_9$ hydrocarbons which were preponderantly trimethyl benzenes and having a boiling range of about 153° C. to about 180° C. (307° F. to 356° F.) was used as the source of aromatic hydrocarbons. 133 pounds of this aromatic petroleum stock, 42.4 pounds of "Super Filtrol" clay, and 19.9 pounds of trioxymethylene were heated in a closed pressure resistant vessel at 240° F. to 250° F. for 12 hours. The reaction mixture was filtered to remove the clay and unreacted trioxymethylene. The filtrate was water washed and filtered a second time through freshly activated "Super Filtrol" clay using about 10 per cent by weight based upon the weight of the filtrate. The amount of clay employed for the second filtration may vary from about 10 per cent by weight to the amount necessary for use as a catalyst for another batch, say about 30 per cent to about 35 per cent by weight of the filtrate. This clay, used only for decoloration, may be used as a catalyst for another batch if so desired without activation. The filtrate was then distilled at a pressure of 10 millimeters of mercury to a pot temperature of 300° C. (572° F.). 27$\frac{1}{16}$ pounds of intermediate viscous oils and about 10 pounds of light colored amber resin topped to 300° C. (pot temperature) at 10 millimeters were recovered. The resin had a molecular weight of 486 [equivalent to 3.7 ($-(CH_3)_3C_6HCH_2-$) units], a ring and ball melting point of 161° F., and a hydroxyl number of 8.

The viscous oil was fractionated as indicated in Table I. The properties of the various fractions so obtained are summarized in Table II. The materials were progressively more viscous as their boiling points increased with the last fraction showing very little tendency to flow.

TABLE I

| Cut No. | Wt. of Cut, lbs. | Vapor Temperature, °C. | |
|---|---|---|---|
| | | Calc'd. to 760 mm. | at 10 mm. |
| 1 | 0.61 | 180–250 | 58–116 |
| 2 | 1.29 | 250–320 | 116–178 |
| 3 | 11.9 | 320–390 | 178–225 |
| 4 | 2.68 | 390–460 | 225–290 |

Various data for the foregoing fractions are provided in Table II. Cut 1 is chiefly the higher boiling material of the original aromatic stock.

TABLE II

*Viscous oil intermediates from aromatic hydrocarbons, trioxymethylene and "Super Filtrol" clay*

| Hydrocarbon Stock | "Sovasol" #75 (75% overhead) | "Sovasol" #75 (75% overhead) | "Sovasol" #75 (75% overhead) | "Sovasol" #75 (75% overhead) |
|---|---|---|---|---|
| Boiling Range, °C. (vapor) 760 mm. (calc'd) | 180–250 | 250–320 | 320–390 | 390–460 |
| Gravity, A. P. I. | 19.0 | 14.9 | 11.9 | 10.9 |
| Flash, °F | 185 | 215 | 320 | 370 |
| Fire, °F | 200 | 240 | 400 | 440 |
| Kinematic Viscosity at 100° F., Centistokes | 3.28 | 5.57 | 74.8 | 573 |
| Kinematic Viscosity at 210° F., Centistokes | 1.17 | 1.53 | 4.52 | 9.10 |
| Color, Lovibond | 0.75 | 0.25 | 0.25 | 1.1 |
| Carbon Residue, percent | 0.01 | 0.03 | 0.01 | 0.1 |
| Molecular Wt | 197 | 212 | 276 | 315 |
| Estimated Value per Polymer Unit | 132 | 132 | 132 | 132 |
| Average No. of Units | 1.49 | 1.61 | 2.09 | 2.38 |
| Specific Gravity | 0.940 | 0.967 | 0.966 | 0.993 |

Cut 3 (275 grams), 45 grams of trioxymethylene, 45 grams of "Super Filtrol" clay, and 100 cubic centimeters of Stoddard solvent were heated together at atmospheric pressure for 12 hours at 110° C. The reaction mixture was filtered, the clay catalyst washed with benzol and the combined filtrates distilled. Thirty-nine grams of product boiled below 175° C. at 10 millimeters (320° C. at 760 millimeters). A second fraction (110 grams) boiled at 175–230° C. at 10 millimeters (320–390° C. calculated to 760 millimeters) and a final distillate (48.5 grams) boiled at 230–285° C. at 10 millimeters (390–460° C. calculated to 760 millimeters) leaving behind 100 grams of very clear light amber resin having a ring and ball melting point of 192° F. and a molecular weight of 489 (equivalent to 3.67

—(CH₃)₃C₆HCH₂— units). Thus, it is evident that the oil intermediates may be converted into solid resins if so desired.

A portion of the original oil distillate as obtained in this experiment in topping the resin was distilled under reduced pressure into somewhat different fractions with the hope of obtaining fractions of $(CH_3)_3C_6H_2CH_2C_6H_2(CH_3)_3$, $(CH_3)_3C_6H_2CH_2C_6H(CH_3)_3CH_2C_6H_2(CH_3)_3$ or higher similar materials. A fraction boiling at 110 degrees to 222 degrees centigrade at 8 millimeters of mercury (247–368° C.—calculated to 760 millimeters) had a molecular weight of 272. The theoretical value for the molecular weight was 253. This fraction was possibly the "dimer," $(CH_3)_3C_6H_2CH_2C_6H_2(CH_3)_3$, contaminated with some higher molecular weight material.

A somewhat higher boiling fraction (205° C. at 7 millimeters–250° C. at 10 millimeters or 368–412° C. calculated to 760 millimeters) was chiefly the "dimer," $(CH_3)_3C_6H_2CH_2C_6H_2(CH_3)_3$. Molecular weight found, 266; calculated, 253.

The material boiling at 240–280° C. at 7 millimeters (410–465° C.—calculated to 760 millimeters) had a molecular weight of 384 while the "trimer," $(CH_3)_3C_6H_2CH_2C_6H(CH_3)_3CH_2C_6H_2(CH_3)_3$, has a theoretical molecular weight of 375.

The negligible hydroxyl numbers of the various intermediate oils indicate the absence of —CH₂OH groups.

EXAMPLE IV

Another aromatic petroleum stock boiling at 354° F. to 520° F., having a specific gravity of $$0.888\left(\frac{60° F.}{60° F.}\right)$$

an average molecular weight of 165 and a mixed aniline point of 84° F. was the source of aromatic hydrocarbons for the production of resinous products and viscous oils. This aromatic stock contained about 70 per cent by weight aromatic hydrocarbons, chiefly highly alkylated benzenes (tetra-alkyl) and lower alkylated naphthalenes.

One hundred and forty-seven and eight-tenths pounds of the aforedescribed aromatic petroleum stock, 19 pounds of trioxymethylene and 37 pounds of "Super Filtrol" clay were charged to a pressure resistant container. These materials were stirred and heated to 240° F. to 250° F. for 14 hours at a gauge pressure of 40–45 pounds per square inch. The reaction mixture was filtered and the filtrate steam distilled to give 57.3 pounds of a highly concentrated resin solution. About 0.3 volume or about 2 gallons of benzol were added to the concentrated resin solution and the last traces of water distilled. Other diluents or solvents which form azeotropes with water may be used in quantities sufficient to ensure removal of the major portion of the water as distillate. The residual liquid was then topped at a pressure of 10 millimeters of mercury to a pot temperature of 572° F. (300° C.). An intermediate oil weighing 10.5 pounds was recovered as a distillate and a resinous residue weighing 16 pounds remained in the still. This residue was amber colored. The resin had a ring and ball melting point of 162° F., a hydroxyl number of 2 and a molecular weight of 404 (equivalent to 2.48 units of about 163 grams per mole each).

The viscous oil intermediates were distilled at about 10 millimeters into the fractions as indicated hereinafter.

| Cut No. | Weight of Cut, lbs. | Vapor Temperature Range, °C., at— | |
|---|---|---|---|
| | | 760 mm. | 10 mm. |
| 1 | 4.64 | 272–319 | 52–170 |
| 2 | 0.795 | 319–366 | 170–210 |
| 3 | 0.857 | 366–413 | 210–241 |
| 4 | 4.12 | 413–460 | 241–285 |

The properties of these oil fractions are summarized in Table III. Cut 1 is chiefly the higher boiling material of the original aromatic stock,

Table III

*Viscous oil intermediates from aromatic hydrocarbons, trioxymethylene and "Super Filtrol" clay*

| Hydrocarbon Stock | 70% Tetra-alkylated Benzenes and Alkylated Naphthalenes | | | |
|---|---|---|---|---|
| Boiling Range, °C. (vapor) 760 mm | 272–319 | 319–366 | 366–413 | 413–460 |
| Gravity, A. P. I | 10.2 | 6.5 | 5.1 | solid |
| Flash, °F | 275 | 300 | 360 | 435 |
| Fire, °F | 295 | 355 | 410 | 525 |
| Kinematic Viscosity at 100° F., Centistokes | 4.14 | 27.9 | 938.4 | Too high |
| Kinematic Viscosity at 210° F., Centistokes | 1.32 | 3.28 | 11.19 | 76.56 |
| Color, Lovibond | 1.1 | .6 | 4 | 12 |
| Molecular Wt | 197 | 254 | 310 | 349 |
| Estimated Value per Polymer Unit | 163 | 163 | 163 | 163 |
| Average No. of Units | 1.21 | 1.56 | 1.9 | 2.4 |

EXAMPLE V

An aromatic petroleum stock having a mixed aniline point of 58.5° F., a specific gravity of $$0.986 \left( \frac{60° \text{ F.}}{60° \text{ F.}} \right)$$

a flash point of 265° F. (Cleveland open cup), a boiling range of 480° F. to 622° F. and containing about 90 per cent to about 100 per cent aromatic hydrocarbons was the source material for another resinification.

The aforedescribed aromatic petroleum stock, 300 cubic centimeters of Stoddard solvent, 75 grams of trioxymethylene and 100 grams of "Super Filtrol" were stirred and heated 12 hours at 110° C. (230° F.). The reaction mixture was filtered to remove the clay and washed with an aromatic petroleum stock available to the art under the trade name "Sovasol" #75. The first filtrate and the washings were combined and washed with sodium bisulfite and water. The washed filtrates were then distilled at a pressure of 2.5 millimeters of mercury. A light yellow oil (78.5 grams) was obtained at a pot temperature of 175° C. to 180° C. A second fraction of 18.5 grams was obtained at a pot temperature of 280° C. to 290° C. and 2.5 millimeters pressure. This fraction was an extremely viscous oil. A residue of greenish-red brittle resin, ring and ball melting point 198° F., and weighing 237 grams was also obtained.

EXAMPLE VI

An aromatic petroleum stock containing aromatics in the proportion of 90 per cent or better was also treated in a manner similar to the foregoing. This stock contained polynuclear aromatic hydrocarbons and had a flash point (Cleveland open cup) of 335° F., a specific gravity of $$1.052 \left( \frac{60° \text{ F.}}{60° \text{ F.}} \right)$$

a mixed aniline point of 58° F. and a boiling range of 578° F. to 760° F.

Seven hundred and fifty parts by weight of the aforedescribed polynuclear aromatic stock dissolved in about 240 parts by weight of Stoddard solvent, 120 parts by weight of trioxymethylene and 100 parts by weight of "Super Filtrol" clay were stirred and heated at atmospheric pressure for 12 hours at 110° C.

The reaction mixture was filtered and the clay washed with aromatic petroleum stock ("Sovasol" #74). The washings and the first filtrate were combined, washed with alkali metal bisulfite solution and, finally, water washed. The washed filtrate was topped to a pot temperature of 290° C. at a pressure of 2 millimeters of mercury. A black brittle resin (ring and ball melting point of 239° F.) was obtained as a still residue in the amount of 178 grams. In addition, 21 grams of a viscous greenish-brown liquid distilling at a pot temperature of 270° C. to 290° C. at 2 millimeters was also recovered.

EXAMPLE VII

"Sovasol" #75 (75 per cent overhead) (400 grams), 90 grams of trioxymethylene and 90 grams of a catalyst of 50 per cent by weight $H_3PO_4$ on Darco charcoal were stirred together at atmospheric pressure for 12 hours at 110° C. The reaction mixture was filtered and the solid catalyst washed with benzol. The organic filtrates were combined, washed with sodium bisulfite solution and with water, dried, and distilled. There were no noticeable intermediate oils but 139.5 grams of hard reddish-brown brittle resin was obtained, by topping to 260° C. (pot temperature) at 30 millimeters. This resin was darker than that produced using "Super Filtrol" clay as the catalyst.

A similar experiment with a catalyst comprising 30 per cent by weight $H_3PO_4$ on silica gel gave a 16.7 conversion to solid resins and about an 8 per cent conversion to oil intermediate.

Orthophosphoric acid (5 per cent by weight) on "Super Filtrol" gave no noticeable improvement over "Super Filtrol" alone. The product was somewhat darker than that produced using "Super Filtrol" alone.

Sodium hydroxide (2 per cent by weight) on "Super Filtrol" gave a lighter colored resin than "Super Filtrol" alone. This experiment showed 23 per cent conversion to oil intermediates and 8.4 per cent conversion to solid resins.

EXAMPLE VIII

As a source of aromatic hydrocarbons "Sovasol" #74 was used. This aromatic petroleum fraction had a boiling range of 275° F. to 375° F. and contained 70 per cent aromatics, including ethylbenzene, the xylenes, and small amounts of 1-methyl-4-ethylbenzene and trimethyl benzenes.

A reactor charge composed of 8.153 kilograms of "Sovasol" #74, 1.536 kilograms of "Super Filtrol" and 1.65 kilograms of trioxymethylene was introduced into a 30 gallon Dopp reactor. The reaction mixture was stirred and heated together for 14 hours at 230 degrees ± 10 degrees Fahrenheit.

The reaction mixture was filtered warm by suction to remove clay and the filtrate steam-distilled in a 30 gallon glass-lined Pfaudler kettle to remove unreacted "Sovasol" #74. The residue was vacuum topped to 300° C. (pot temperature) at 10 millimeters to give 455 grams of oil intermediates and only 138 grams of rather dark somewhat brittle resin.

A portion of the oil intermediates were distilled into fractions under reduced pressure:

| Cut | Boiling Range | Relative Weight | Molecular Wt. |
|---|---|---|---|
| 1 | 105–176° C. (8 mm.) | 1 | 208 |
| 2 | 176–202° C. (8 mm.) | 4 | 274 |
| 3 | 202–275° C. (8 mm.) | 1.6 | 351 |

Cut 3 had a hydroxyl number of 46 indicating the presence of some side chain alcohol groups; $(CH_3)_2C_6H_3CH_2OH$ has a molecular weight of 136 and hydroxyl number of 411.9;

has a molecular weight of 244 and a hydroxyl number of 244]. The molecular weight of cut 4 as indicated (351) corresponds fairly close to the "trimer,"

(CH₃)₂C₆H₃CH₂C₆H₂(CH₃)₂CH₂C₆H₃(CH₃)₂ which has a molecular weight of 343. It would appear that cut 3 is the "trimer" contaminated with lower molecular weight alcohol and possibly traces of "tetramer."

Cut 2 (molecular weight 274) would appear to be a mixture of the "dimer,"

(CH₃)₂C₆H₃CH₂C₆H₃(CH₃)₂

(molecular weight 224) and the "trimer" molecular weight 343).

EXAMPLE IX

Hydrogenated aromatic petroleum stock (alkyl tetralins, chiefly, with A. P. I. gravity of 14) (136 grams), 60 grams of trioxymethylene, 100 cubic centimeters of Stoddard solvent, and 90 grams of "Super Filtrol" clay were heated and stirred together at atmospheric pressure for 12 hours at 110° C.

The clay was removed by filtration and washed with 200 cubic centimeters of benzol. The filtrates were fractionated as follows:

Cut 1 boiling up to 190° C. at 17 millimeters (calculated 330° C. at 760 millimeters) was discarded. Cut 2, weighing 92 grams (190° C. to 304° C. at 17 millimeters) contained possibly some alkyl tetralins. The residue was a reddish-amber brittle resin weighing 68 grams (about 50 per cent conversion).

A number of runs were made using members of this novel class of catalysts other than "Super Filtrol" clay. These runs were made using an aromatic petroleum stock having a boiling range of 153° C. to 180° C. containing about 60 per cent aromatic hydrocarbons, chiefly trimethyl benzenes. All the tests were carried out in glass lined equipment at atmospheric pressure. The results are collected in the following table:

matic petroleum stocks and are preferred charge stocks for the process.

"Sovasol" #75 is a generic term connoting aromatic petroleum stocks derived from Houdry cracking operations. These stocks have boiling point ranges varying between 150° C. and 210° C. and ordinarily contain between 50 per cent and 75 per cent aromatic hydrocarbons and the balance non-aromatic hydrocarbons, depending upon the source of the Houdry cracking stock and the severity of the cracking procedure in the Houdry units. The aromatic hydrocarbons that occur in "Sovasol" #75 stocks are believed to be, primarily, polyalkyl benzenes ranging from trimethyl benzene to tetramethyl benzene and including methylethyl benzenes and the propyl benzenes. There are three trimethyl benzenes, mesitylene or 1,3,5-trimethyl benzene; pseudocumene or 1,2,4-trimethyl benzene; hemimellitene or 1,2,3-trimethyl benzene. Likewise, there are three tetramethyl benzenes, durene or 1,2,4,5-tetramethyl benzene; isodurene or 1,2,3,5-tetramethyl benzene; and prehnitene or 1,2,3,4-tetramethyl benzene. The trimethyl benzenes constitute the predominant portion of the polyalkyl benzenes present in "Sovasol" #75 stocks. For example, if a "Sovasol" #75 stock containing 55 per cent aromatic hydrocarbons is subjected to distillation, the fraction boiling between 150° C. and 182° C. will contain 60 per cent (82 per cent of the aromatic hydrocarbons in original "Sovasol" #75) and will constitute 75 per cent of the original "Sovasol" #75 stock. This temperature range (150° C. to 182° C.), includes the boiling points of the trimethyl benzenes but does not include the boiling points of the tetramethyl benzenes.

Typical of stocks suitable for treatment by the present method are recycle stocks from cracking operations, cracked residue or distillates therefrom, solvent tars, reforming tars and distillates of such tars, and highly aromatic gas oils. Straight run stocks having an appreciable

TABLE IV

*Resins prepared from a stock containing trimethylbenzenes using catalysts other than "Super Filtrol" clay*

| Example No. | Grams Aromatic Stock¹ | Grams of Trioxy-methylene | Catalyst | Grams of Catalyst | Reaction Conditions | | Conditions for Topping Resin | | Description of Resin |
|---|---|---|---|---|---|---|---|---|---|
| | | | | | Temp., °C. | Time, Hours | Pot Temp., °C. | Mm. | |
| X | 400 | 90 | A | 90 | 110 | 12 | 300 | 5.5 | Amber-red. |
| XI | 200 | 45 | B | 45 | 110 | 12 | ²260 | 10 | Light amber. |
| XII | 400 | 90 | C | 90 | 110 | 12 | 285 | 5.0 | Do. |
| XIII | 200 | 45 | D | 45 | 110 | 12 | 300 | 7 | Do. |

¹ For properties of this stock see Example I.
² Vapor Temperature instead of Pot Temperature.
Catalyst A—Fresh burnt Attapulgus clay.
Catalyst B—Alumina silica gel cracking catalyst containing about 7% to about 15% alumina.
Catalyst C—Powdered silica gel.
Catalyst D—Powdered synthetic silica gel alumina cracking catalyst containing about 7% to about 15% alumina.

In the foregoing description of the present invention the term aromatic petroleum stock has been used. As those skilled in the art know, aromatic petroleum stocks are mixtures of aromatic and non-aromatic hydrocarbons which, for the purposes of this invention are generally, those that contain a relatively high percentage of aromatic hydrocarbon constituents. Thus those aromatic petroleum stocks sold commercially under the trade-mark "Sovasol," and particularly those known to the solvent industry as "Sovasol" #75, are illustrative of these aromatic hydrocarbon content, of the order of 15 per cent to 25 per cent, are also amenable to treatment in accordance with the process of this invention. However, these latter are not considered the preferred charge stocks. It is preferred to use charging stocks containing upwards of 50 per cent aromatic hydrocarbons and these are to be considered the preferred charge stocks.

The effect of the variation of either the clay charge or the ratio of moles formaldehyde/moles aromatic hydrocarbons are summarized in Table V while the effect of variations in temperature are shown in Table VI.

TABLE V

*The effect of variation of either clay or formaldehyde aromatic ratio in producing resins and oils from "Sovasol" #75 (75% overhead)*

| Run | Formaldehyde Aromatic Mole Ratio | Grams of Super Filtrol Clay | Percent Clay of Total wt. of Sov. #75 | Reaction Conditions | | Percent Conversion to Int. Oil | Percent Conversion to Resin |
|---|---|---|---|---|---|---|---|
| | | | | Time, Hours | Temp., °F. | | |
| 1 | 0.5 | 0 | 0 | 6 | 300±10 | 0 | 0 |
| 2 | 0.5 | 14.6 | 5 | 6 | 300±10 | 10.29 | 3.77 |
| 3 | 0.5 | 14.6 | 5 | 6 | 300±10 | 10.97 | 3.77 |
| 4 | 0.5 | 43.8 | 15 | 6 | 300±10 | 13.36 | 7.54 |
| 5 | 0.5 | 73.0 | 25 | 6 | 300±10 | 21.22 | 8.57 |
| 6 | 0.5 | 73.0 | 25 | 6 | 300±10 | 15.4 | 8.9 |
| 7 | 0.5 | 73.0 | 25 | 2 | 300±10 | 13.7 | 9.25 |
| 8 | Reused clay from #7 [1] | | | 2 | 300±10 | 8.22 | 2.74 |
| 9 | 1 | 73.0 | 25 | 6 | 300±10 | 19.51 | 9.94 |
| 10 | 2 | 73.0 | 25 | 6 | 300±10 | 25.35 | 11.64 |
| 11 | 0.5 | 146 | 50 | 6 | 300±10 | 14.02 | 11.3 |

[1] This run made use of the clay and unused trioxymethylene from run #7 T. O. M. (21.9 gms.) was added in addition to that already present.

The data presented in Table V is graphically presented in Figures 1 and 2 of the drawings, while the data set forth in Table VI is presented in Figures 3 and 4.

TABLE VI

*The effect of variation in temperature in producing resins and oils from "Sovasol" #75 (75% overhead)*

| Run | Formaldehyde Aromatic Mole Ratio | Per Cent Clay of Total wt. of Sov. #75 | Reaction Conditions | | Per Cent Conversion to Int. Oil | Per Cent Conversion to Resin | Remarks |
|---|---|---|---|---|---|---|---|
| | | | Time, (hours) | Temp., °F. | | | |
| 6 | 0.5 | 25 | 6 | 300±10 | 15.4 | 8.9 | |
| 7 | 0.5 | 25 | 2 | 300±10 | 13.7 | 9.25 | |
| 12 | 0.5 | 25 | 3.5 | 410±10 | 14.38 | 9.94 | Sweet smelling unidentified gas also formed. |
| 13 | 0.5 | 25 | 3.0 | 470±6 | 13.7 | 7.54 | Do. |
| 10 | 2.0 | 25 | 6.0 | 300±10 | 25.35 | 11.64 | |
| 14 | 2.0 | 25 | 3.0 | 395±10 | 6.85 | 16.6 | |
| 15 | 2.0 | 25 | 5.0 | 425±10 | 9.92 | 16.45 | |
| 16 | 2.0 | 25 | 4.5 | 475±10 | 9.25 | 14.62 | |
| 17 | 2.0 | 25 | 5 | 355±10 | 13.7 | 16.45 | |

The properties of the resinous reaction products have extremely wide limits. Many times the desired product is an extremely viscous liquid obtained by simply topping the clay-free resin solution to remove unreacted hydrocarbon stock and low boiling reaction products. When topped at a slightly higher temperature, the residue from the same reaction product may be a tacky solid or when topped at even higher temperatures, under reduced pressure, the condensate will be a viscous liquid and the residue a non-tacky solid. In general, the melting points of the solid resins of this type will vary over a wide range with the materials topped at the higher temperatures having the higher melting points. In general, increasing the melting point of solid resins beyond certain limits may lead to extremely brittle resins. It is possible, therefore, to prepare resins of the proper viscosity, flash point, fire point and melting point for many uses. In the illustrative examples, the unreacted hydrocarbon stock was separated from the resins by either vacuum or steam distillation, or both. However, other methods of separation such as extraction, the addition of diluents such as petroleum ether, solvent naphtha and the like, with or without chilling, adsorption on clays followed by desorption and the like, may be used.

Although the foregoing illustrative examples have illustrated only the use of solid forms of materials capable of evolving formaldehyde, it is to be understood that formalin (37 per cent aqueous formaldehyde solution) and other carbonyl compounds such as acetone, may be used. Furthermore, it is to be understood that the phrase "clay of the montmorillonite type" is used in the appended claims as a generic term for all of the novel condensation catalysts disclosed herein.

It is to be noted that the viscous fluids produced by the present process can be used as plasticizers, softeners for synthetic rubber, liquids for quartz testing and as hydraulic fluids and the like. Furthermore, those products of the present invention having the nature of viscous fluids and having a specific gravity between about 0.990 and 1.03 may be used as culicides.

I claim:

1. The method of producing viscous liquids and resinous solids which comprises heating an aromatic petroleum stock boiling within the range of about 300° F. to about 760° F., with trioxymethylene and acid activated clay of the montmorillonite type as the sole essential condensing agent at a temperature of about 158° F. to about 420° F., for at least about 12 hours to obtain reaction products, separating said reaction products from said clay, concentrating said separated reaction products, and separating said reaction productions into a liquid and a resinous mass.

2. A method of producing viscous liquids and resinous solids which comprises heating together at elevated temperatures until condensation occurs an aromatic hydrocarbon, formaldehyde and solid inorganic catalytic material having as the sole essential component one of the group consisting of acid activated clay of the montmorillonite type, fresh burnt Attaplulgus clay, alumina-silica gel catalysts containing about 7 per cent to about 15 per cent alumina and silica gel, and separating said solid catalytic material from the reaction mixture.

3. The method of producing viscous liquids and resinous solids as described and set forth in claim 2 wherein the separated catalytic material is employed to catalyze the reaction between further amounts of aromatic hydrocarbon and formaldehyde.

4. The method of producing resinous solids admixed in situ with inorganic filler which comprises heating together at elevated temperatures until condensation occurs an aromatic hydrocarbon, formaldehyde and solid inorganic catalytic material having as the essential component one of the group consisting of acid activated clay of the montmorillonite type, fresh burnt Attapulgus clay, alumina-silica gel catalysts containing about 7 per cent to about 15 per cent alumina and silica gel, subjecting the reaction mixture to distillation to obtain a still residue consisting of resinous condensation product admixed with said solid inorganic catalytic material.

5. A method of producing viscous liquids and resinous solids which comprises heating together at elevated temperatures for several hours an aromatic hydrocarbon, formaldehyde and solid inorganic catalytic material consisting of acid activated clay of the montmorillonite type and separating viscous oil from resinous solid.

6. The method as set forth in claim 5 wherein the acid activated clay is separated from the reaction mixture and re-used for the production of further amounts of condensation products of an aromatic hydrocarbon and formaldehyde.

7. The method of preparing viscous liquids and resinous solids which comprises heating together for several hours an aromatic hydrocarbon, formaldehyde and solid inorganic catalytic material having as the sole essential component one of the group consisting of acid activated clay of the montmorillonite type, fresh burnt Attapulgus clay, alumina-silica gel catalysts containing about 7 per cent to about 15 per cent alumina and silica gel, separating said solid catalytic material from the reaction products, extracting said catalytic material with a solvent for said reaction products, combining said separated reaction products and said extract, contacting said reaction products and said extract with decolorizing clay, separating said decolorizing clay from decolorized reaction products, and using said decolorizing clay to catalyze the condensation of an aromatic hydrocarbon and formaldehyde at elevated temperatures.

8. The method of producing viscous liquids and resinous solids which comprises heating an aromatic petroleum stock boiling within the range 275° to 760° F., and formaldehyde polymer with solid inorganic catalytic material having as the sole essential component one of the group consisting of acid activated clay of the montmorillonite type, fresh burnt Attapulgus clay, alumina-silica gel catalysts containing about 7 per cent to about 15 percent alumina and silica gel and separating a viscous liquid from a resinous still residue.

9. The method of producing viscous liquids and resinous solids as set forth in claim 8 wherein the solid inorganic catalytic material is separated from the reaction products and used to catalyze the condensation of an aromatic hydrocarbon and formaldehyde at elevated temperatures.

10. The method of producing viscous liquids and resinous solids as set forth in claim 8 wherein the condensation is carried out at temperatures of 150° to 420° F.

11. The method of producing viscous liquids and resinous solids as set forth in claim 8 wherein the condensation is carried out at temperatures of 150° to 250° F. for at least 12 hours.

12. The method of producing viscous liquids and resinous solids which comprises heating an aromatic petroleum stock boiling within the range 300° to 371° F., at a pressure of 760 millimeters with trioxymethylene in the ratio of about 133 to 20 by weight, for at least 12 hours and at a temperature of 240° to 250° F., under autogenous pressure in the presence of acid activated montmorillonite type clay as the sole essential catalyst, separating said clay and unreacted trioxymethylene from liquid reaction products, water-washing said separated liquid products, percolating said water-washed separated liquid products through activated decolorizing clay, distilling said percolated liquid products under reduced pressure to obtain viscous liquids boiling up to a temperature of 572° F., at a pressure of 10 millimeters of mercury and a resin having a molecular weight of about 486, a hydroxyl number of 8 and a ring and ball melting point of 161° F., fractionating said viscous liquids to obtain fractions having kinematic viscosities at 100° F., of 3.28 to 573 centistokes and at 210° F., of 1.17 to 9.10 centistokes.

13. The method of producing viscous liquids and resinous solids which comprises heating an aromatic petroleum stock having a boiling range of about 354° to about 520° F., with trioxymethylene in the presence of acid activated clay of the montmorillonite type as the sole essential catalyst for about 12 to about 14 hours at a pressure of about 40 to about 45 pounds per square inch and at a temperature of about 230° to about 250°. F., separating said acid activated clay and unreacted formaldehyde polymer from the reaction products, and separating a viscous liquid as a condensate from a resinous still residue.

14. The method described and set forth in claim 13 wherein the aromatic petroleum stock has a boiling range of about 480° to about 622° F.

15. In the process of condensing aromatic hydrocarbons with formaldehyde in the presence of a condensation catalyst the improvement which comprises employing a member of the group consisting of acid activated clay of the montmorillonite type, fresh burnt Attapulgus clay, alumina-silica gel catalysts containing about 7 per cent to about 15 per cent alumina and silica gel as the sole essential condensing agent and elevated temperatures.

16. In the process of condensing aromatic hydrocarbons with formaldehyde in the presence of a condensation catalyst the improvement which comprises employing acid activated clay of the montmorillonite type as the sole essential condensing agent and elevated temperatures.

17. In the process of condensing an aromatic hydrocarbon with formaldehyde in the presence of a condensation agent the improvement which comprises employing an acid activated clay of the montmorillonite type as the sole essential condensing agent and temperatures of 150° to 420° F.

CHARLES F. FEASLEY.

REFERENCES CITED

The following references are of record in the file of this patent:

UNITED STATES PATENTS

| Number | Name | Date |
|---|---|---|
| 2,200,763 | Anderson et al. | May 14, 1940 |
| 2,216,941 | Gleason | Oct. 8, 1940 |
| 2,372,018 | Ruthruff | Mar. 20, 1945 |
| 2,375,725 | Bailey et al. | May 8, 1945 |
| 2,367,183 | Bryns | June 16, 1945 |
| 2,384,505 | Thomas et al. | Sept. 11, 1945 |